(12) United States Patent
Gao et al.

(10) Patent No.: US 11,069,233 B1
(45) Date of Patent: Jul. 20, 2021

(54) VIDEO-BASED MAIN ROAD COOPERATIVE SIGNAL MACHINE CONTROL METHOD

(71) Applicant: HEFEI GELV INFORMATION TECHNOLOGY CO., LTD., Anhui (CN)

(72) Inventors: Wanbao Gao, Anhui (CN); Guanglin Zhang, Anhui (CN); Huiling Li, Anhui (CN)

(73) Assignee: HEFEI GELV INFORMATION TECHNOLOGY CO., LTD., Anhui (CN)

( * ) Notice: Subject to any disclaimer, the term of this patent is extended or adjusted under 35 U.S.C. 154(b) by 475 days.

(21) Appl. No.: 16/307,142

(22) PCT Filed: Oct. 31, 2018

(86) PCT No.: PCT/CN2018/112971
§ 371 (c)(1),
(2) Date: Dec. 5, 2018

(87) PCT Pub. No.: WO2019/179107
PCT Pub. Date: Sep. 26, 2019

(30) Foreign Application Priority Data

Mar. 22, 2018 (CN) .......................... 201810238071.3

(51) Int. Cl.
G08G 1/08 (2006.01)
G08G 1/082 (2006.01)
G06F 17/11 (2006.01)
G08G 1/04 (2006.01)
G08G 1/01 (2006.01)

(52) U.S. Cl.
CPC ............... G08G 1/08 (2013.01); G06F 17/11 (2013.01); G08G 1/0145 (2013.01); G08G 1/04 (2013.01); G08G 1/082 (2013.01)

(58) Field of Classification Search
CPC ........ G08G 1/08; G08G 1/0145; G08G 1/083; G08G 1/082; G08G 1/095; G08G 1/04; G06F 17/11
See application file for complete search history.

(56) References Cited

U.S. PATENT DOCUMENTS

| 4,370,718 | A   | * | 1/1983 | Chasek ..................... G08G 1/08 340/911 |
| 10,699,568 | B1 | * | 6/2020 | Gao ..................... G08G 1/0133 |
| 2008/0012726 | A1 | * | 1/2008 | Publicover ........ G08G 1/096791 340/932 |

(Continued)

Primary Examiner — Hoi C Lau
(74) Attorney, Agent, or Firm — JCIPRNET (57) ABSTRACT

The present application discloses a video-based main road cooperative signal machine control method, which includes: installation of video detectors at each intersection of the main road; data acquisition and communication of a single intersection; data acquisition and storage of multiple intersections; data processing of the main road coordination signal control; signal command release service and signal light control. The application adopts active video detection technology, which can accurately detect the traffic state of multiple intersections of the main road, formulate an optimized signal control scheme, provide optimal decision and emergency plan for the control of traffic light of the main road, improve the traffic efficiency of intersections and effectively alleviate traffic congestion on trunk roads.

10 Claims, 4 Drawing Sheets

(56) References Cited

U.S. PATENT DOCUMENTS

| | | | |
|---|---|---|---|
| 2008/0094250 A1* | 4/2008 | Myr | G08G 1/04 340/909 |
| 2017/0270785 A1* | 9/2017 | Umehara | G08G 1/0112 |
| 2019/0051152 A1* | 2/2019 | Malkes | G08G 1/08 |
| 2020/0143672 A1* | 5/2020 | Ashida | G08G 1/0116 |
| 2020/0202710 A1* | 6/2020 | Gao | G08G 1/0145 |

* cited by examiner

VIDEO-BASED MAIN ROAD COOPERATIVE SIGNAL MACHINE CONTROL METHOD

This application claims priority to Chinese Patent Application No. 201810238071.3, filed to the Chinese Patent Office on Mar. 22, 2018, entitled "Video-based main road cooperative signal machine control method", the entire disclosure of which is incorporated herein by reference.

FIELD OF THE INVENTION

The present invention relates to the technical field of traffic signal optimization control, and in particular, to video-based main road cooperative signal machine control method.

DESCRIPTION OF RELATED ART

Urban congestion and accidents are increasingly frequent. In particular, traffic congestion at intersections is severe. If traffic flows cannot be effectively channeled in real time, road congestion will spread, and the efficiency of intersections will be reduced, causing great time and economic losses to the public. Video vehicle detection technology is to install video capture equipment on roads with complicated conditions or easy to form congestion, detect the number, speed and queue length of passing cars, and transmit the collected data back to the server center through wired or wireless network for processing. Technology, through the real-time acquisition of traffic parameters, dynamic traffic signal control can be carried out to achieve effective law of traffic flow, and to minimize traffic congestion.

At present, the signal control methods mainly include timing control, multi-time control, induction control, and adaptive control. The traditional model algorithm is too rigid to set the threshold according to the change of a certain traffic parameter to optimize the signal, which will cause the system to state. Misjudgment.

BRIEF SUMMARY OF THE INVENTION

Based on the technical problems existing in the background art, the present application proposes a video-based main road cooperative signal machine control method.

The video-based trunk road cooperative signal control method proposed by the present application includes:

(S1) collecting lane traffic flow rate and lane traffic flow density of each entrance road section within a preset time interval, by means of video vehicle detectors arranged on each section of the intersection;

(S2) calculating average traffic flow rate and average traffic flow density of each entrance road section of the intersection based on lane traffic flow rate and lane traffic flow density of each entrance road section within the preset time interval;

(S3) calculating the average traffic flow density of the intersection based on the average traffic flow density of each entrance road section, and calculating the average traffic flow density of the main road based on the average traffic flow density of the intersection;

(S4) calculating an intersection signal period of the intersection based on the average traffic flow density at the intersection;

(S5) constructing an intersection signal machine optimization control algorithm model based on the average lane traffic flow rate of each entrance section of the intersection and the average traffic flow density of the intersection, and obtaining the signal control green signal ratio X of each entrance road section of the intersection by the aggregation calculation;

(S6) constructing a main road signal machine optimization control algorithm model based on the average lane traffic flow rate of each entrance road section of the main road and the average traffic flow density of the main road, and obtaining the total signal control green signal ratio Y of the road network by the aggregation calculation;

(S7) comprehensive calculating the final optimized signal control green signal ratio Z, based on the signal control green signal ratio X of each entrance road section of the intersection and the total signal control green signal ratio Y of the road network;

(S8) calculating a green time, a yellow time, and a red time of the main road signal timing based on the final optimized signal control green signal ratio Z and the intersection signal period;

(S9) Form a signal control scheme instruction for the next signal period of each intersection of the main road according to the green time, the yellow time and the red time of the main road signal timing;

(S10) controlling the traffic light of each intersection of the main road carrying out traffic dynamic induction according to the signal control scheme instruction of the next signal cycle of each intersection of the main road, after the end of the cycle control scheme of the signal light.

Preferably, the step S2 specifically includes:

the average traffic flow rate of each entrance road section of the intersection $$\overline{q} = \sum_{n=1}^{N} q_n / N,$$

where n is the number of the lane, and N is the total quantity of lanes of the entrance road section, $q_n$ is the lane traffic flow rate of the lane n;

the average traffic flow density of each entrance road section of the intersection $$\overline{k} = \sum_{n=1}^{N} k_n / N,$$

where n is the number of the lane, and N is the total quantity of lanes of the entrance road section, $k_n$ is the lane traffic flow density of the n-th lane.

Preferably, the step S3 specifically includes:

(S31) the average traffic flow density of the intersection $$K = \sum_{m=1}^{M} \overline{k}_m / M,$$

where m is the number of the entrance road section of the intersection, M is the total quantity of entrance road section of the intersection, $\overline{k}_m$ is the average traffic flow density of the m-th entrance road section;

(S32) the average traffic flow density of the main road $$K = \sum_{i=1}^{I} K_i / I,$$

where i is the number of intersection on the main road, the total quantity of intersections on the main road, $K_i$ is the average traffic density of the i-th intersection of the main road.

Preferably, the step S4 specifically includes:
intersection signal period of the intersection $$C = \begin{cases} 40 & K \leq 6 \\ 60 & 6 < K \leq 12 \\ 90 & 12 < K \leq 24 \\ 120 & 24 < K \leq 48 \\ 150 & 48 < K \leq 90 \\ 180 & K > 90, \end{cases}$$

where K is the average traffic flow density of the intersection.

Preferably, the step S5 specifically includes:
(S51) establishing a Cartesian coordinate system at the center of the intersection, calculating the average traffic flow rate $\bar{q}_{13}$ of the X-axis direction section, and calculating the average traffic flow rate $\bar{q}_{24}$ of the Y-axis direction section;

(S52) establishing an optimization signal control objective function $\omega K(t) + \dot{K}(t) = 0$ of the intersection based on feedback control;

establishing a dynamic traffic flow density variation model of intersections $$\dot{K}(t) = \lim_{\Delta t \to 0} \frac{r_{13}\bar{q}_{13}\Delta t/L + (1-r_{13})\bar{q}_{24}\Delta t/L}{\Delta t} = \frac{r_{13}(\bar{q}_{13} - \bar{q}_{24}) + \bar{q}_{24}}{L};$$

combining the optimization signal control objective function and the dynamic traffic flow density variation model to calculate the green signal ratio $$r_{13} = \frac{\omega K L + \bar{q}_{24}}{\bar{q}_{24} - \bar{q}_{13}}$$

in the X-axis direction, then the signal control green signal ratio $$X_i = \frac{\omega K L + \bar{q}_{24}}{\bar{q}_{24} - \bar{q}_{13}}$$

of the i-th entrance road section of the intersection, where w>0, K(t) is the average traffic flow density of the intersection at time t, $\dot{K}(t)$ is the derivative of the average traffic flow density of the intersection at time t, where L is the length of the road section, $r_{13}$ is the objective signal control green signal ratio in the X-axis direction, Δt is an infinitely short time.

Preferably, the step S51 specifically includes:

$$\bar{q}_{13} = (\bar{q}_1 + \bar{q}_3)/2,$$

Where $\bar{q}_1$ is the average traffic flow rate from the negative X-axis direction to the positive X-axis direction, $\bar{q}_3$ is the average traffic flow rate from the positive X direction to the negative X-axis direction;

$$\bar{q}_{24} = (\bar{q}_2 + \bar{q}_4)/2,$$

where $\bar{q}_2$ is the average traffic flow rate from the negative direction of the Y-axis to the positive direction of the Y-axis, and $\bar{q}_4$ the average traffic flow rate from the positive direction of the Y-axis to the negative direction of the Y-axis.

Preferably, the step S6 specifically includes:
(S61) establishing a Cartesian coordinate system at the center of the main road intersection, calculating the average traffic flow rate $\overline{Q}_{13}$ of the entire road section in the X-axis direction, and calculating the average traffic flow rate $\overline{Q}_{13}$ of the Y-axis direction road section;

(S62) establishing an optimization signal control objective function $\omega K(t) + \dot{K}(t) = 0$ of the main road based on feedback control;

establishing a dynamic traffic flow density variation model of main road $$\dot{K}(t) = \lim_{\Delta t \to 0} \frac{r_{13}\overline{Q}_{13}\Delta t/L + (1-r_{13})\overline{Q}_{24}\Delta t/L}{\Delta t} = \frac{r_{13}(\overline{Q}_{13} - \overline{Q}_{24}) + \overline{Q}_{24}}{L};$$

combining the optimization signal control objective function and the dynamic traffic flow density variation model to calculate the green signal ratio $$r_{13} = \frac{\omega K L + \overline{Q}_{24}}{\overline{Q}_{24} - \overline{Q}_{13}}$$

in the X-axis direction, then the signal control green signal ratio $$Y = \frac{\omega \overline{K} L + \overline{Q}_{24}}{\overline{Q}_{24} - \overline{Q}_{13}}$$

of the road network, where w>0, K(t) is the average traffic flow density of the main road at time t, $\dot{K}(t)$ is the derivative of the average traffic flow density of the main road at time t, where L is the length of the main road, Δt is an infinitely short time.

Preferably, the step S61 specifically includes:
$\overline{Q}_{13} = (\overline{Q}_1 + \overline{Q}_3)/2$, where $\overline{Q}_1$ is the average traffic flow rate from the negative X-axis direction to the positive X-axis direction, $\overline{Q}_3$ is the average traffic flow rate from the positive X direction to the negative X-axis direction;

$\overline{Q}_{24} = (\overline{Q}_2 + \overline{Q}_4)/2$, where $\overline{Q}_2$ is the average traffic flow rate from the negative direction of the Y-axis to the positive direction of the Y-axis, $\overline{Q}_4$ is the average traffic flow rate from the positive direction of the Y-axis to the negative direction of the Y-axis.

Preferably, the step S7 specifically includes:
the final optimized signal control green signal ratio of the i-th intersection of the main road $$Z_i = \frac{X_i + Y}{2}.$$

Preferably, the step S8 specifically includes:

the green time $G_{13}(i)=C_i \times Z_i$ of the X-axis direction of the i-th intersection of the main road, the red time of the east-west direction $R_{13}(i)=C_i-G_{13}(i)-Y$, where $C_i$ is the average traffic flow density of the i-th intersection of the main road, $10 \leq G_{13}(i) \leq C-10$, Y is the yellow time.

This application is based on the feedback control theory, extracting the signal control optimization algorithm of intersection, through the real-time detection and comprehensive analysis of the average traffic density of each intersection of the main road, can greatly improve the traffic operation efficiency of the intersection; based on the detected traffic flow rate and the traffic flow density parameter, the real-time traffic status of each intersection are accurately detected on the main road, formulating an optimal signal control scheme for the main road, providing real-time decision-making and emergency response information for trunk road traffic management and control, and improving road traffic efficiency and service level.

DETAILED DESCRIPTION OF THE INVENTION

Figure 1:
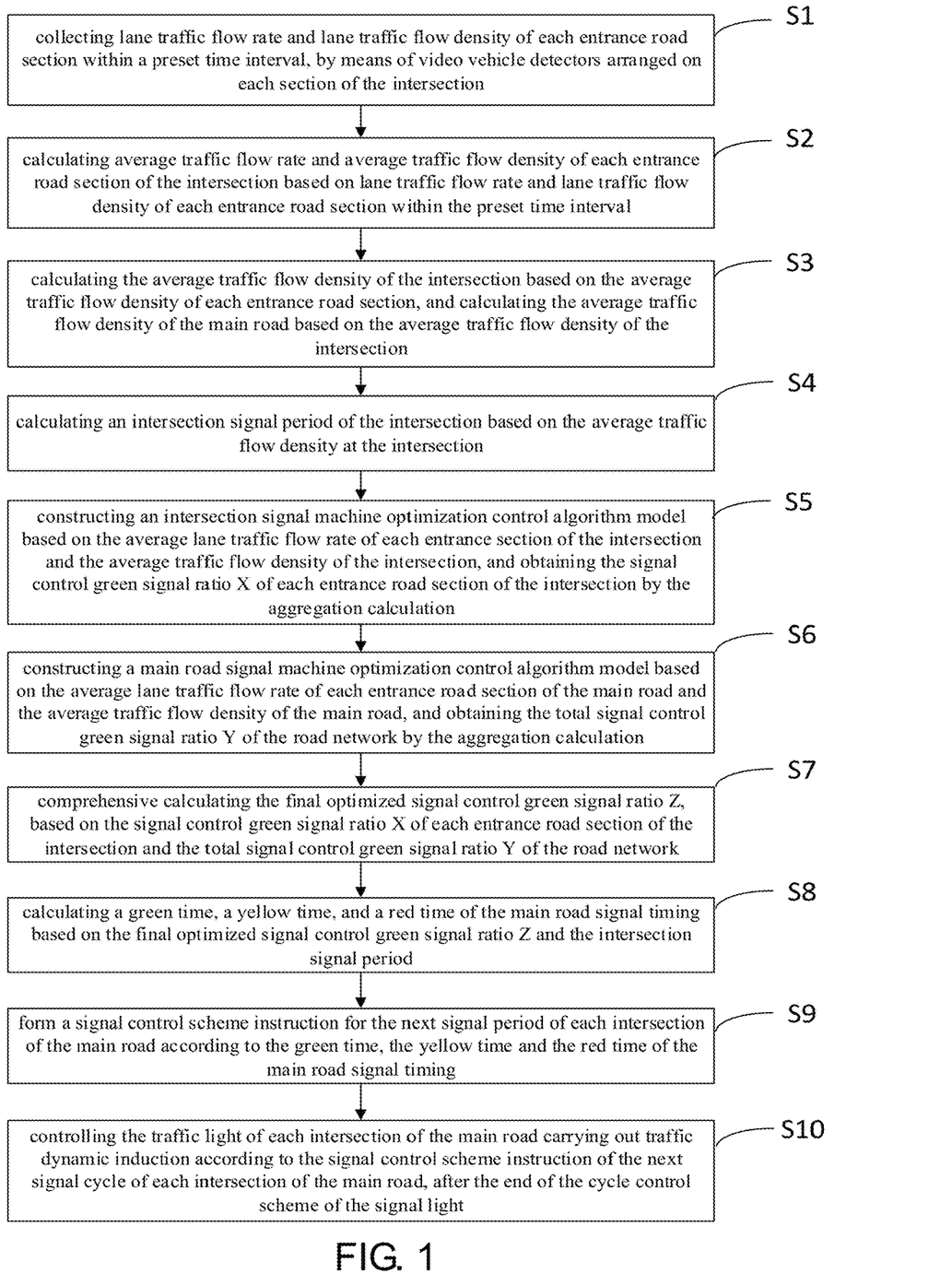
FIG. 1 is a schematic flow chart of a video-based main road cooperative signal machine control method according to the present application.

Refer to FIGS. 1-4, the present application proposes video-based main road cooperative signal machine control method, which including:

Step S1, collecting lane traffic flow rate and lane traffic flow density of each entrance road section within a preset time interval, by means of video vehicle detectors arranged on each section of the intersection.

Figure 2:
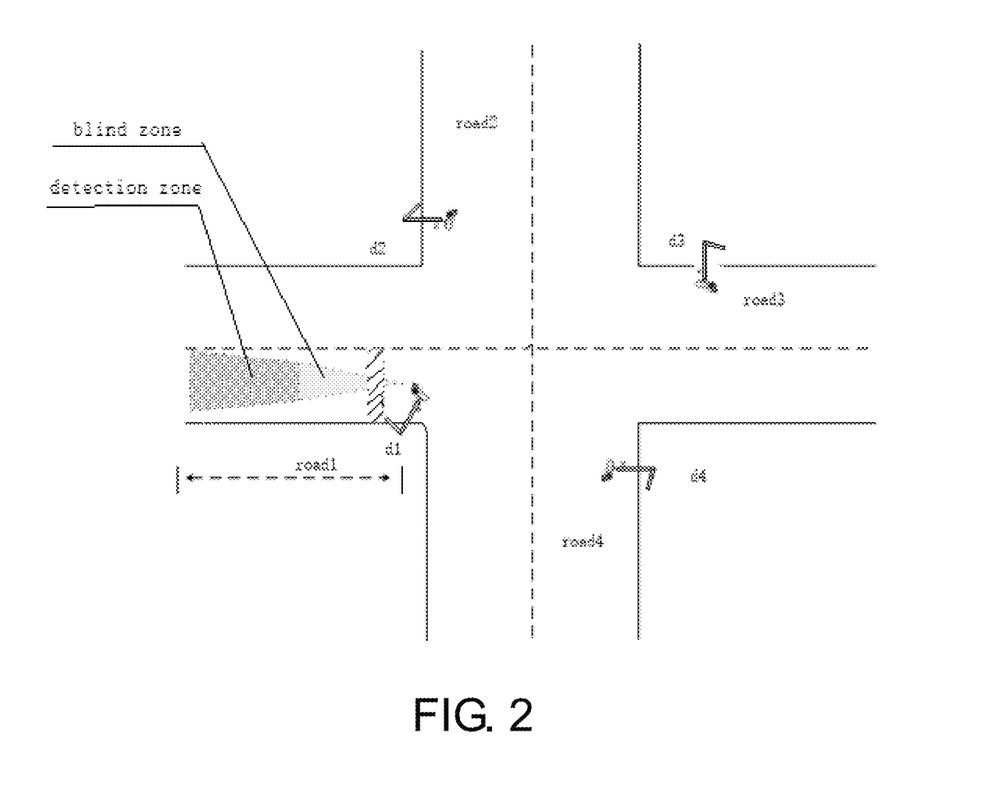
FIG. 2 is a schematic diagram of installation of a video vehicle detector in the present application.

In the specific embodiment, the intersection is a 4 in 4 out crossroad, and the range of the entrance road section that the video vehicle detector can detect is 10 meters to 100 meters. The blind area is within 10 meters ahead of the installation position, and the dynamic information of the vehicle cannot be detected in the blind zone. Therefore, the installation position of video vehicle detector at the crossroad is very important. After determining the entrance road section to be detected, the detection zone and the blind zone critical line are located 10-20 meters ahead of the parking line. The general installation diagram of the crossroad is shown in FIG. 2.

The data format collected by the video vehicle detector is (t, n, q, k), where t indicates the acquisition time, n indicates the number of the lane, q indicates is the lane traffic flow rate, and k indicates the lane traffic flow density. The units of (t, n, q, k) are respectively seconds, 1, vehicle/hour/lane and vehicle/Km/lane.

Figure 3:
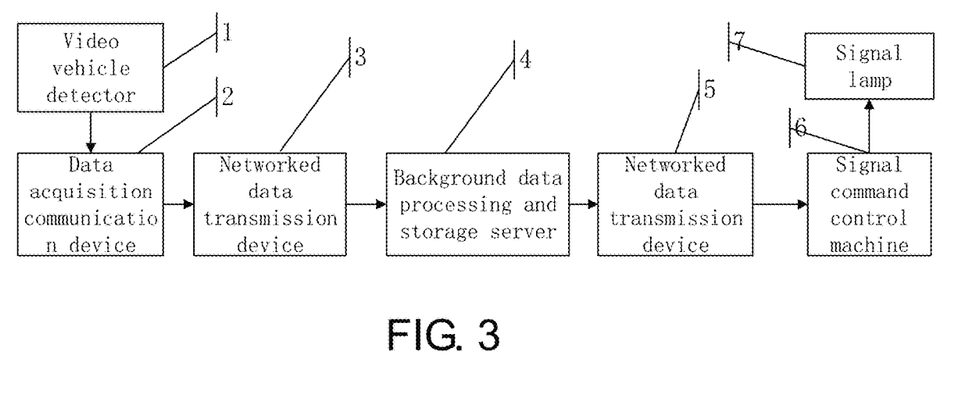
FIG. 3 is a schematic diagram of equipment connection in the present application.

As shown in FIG. 3, the equipment used in the method includes a video vehicle detector 1, a data acquisition communication device 2, a networked data transmission device I3, a background data processing and storage server 4, a networked data transmission device II5, and a signal command control machine 6, and the signal lamp 7, the data acquisition storage device 2 and the video vehicle detector 1 are connected by cables and then installed on the monitoring frame of the intersection, and the data acquisition communication device 2 and the networked data transmission device I3 are connected by a network cable, and the above devices are connected by signal in sequence.

Step S2, calculating average traffic flow rate and average traffic flow density of each entrance road section of the intersection based on lane traffic flow rate and lane traffic flow density of each entrance road section within the preset time interval.

The step S2 specifically includes:

the average traffic flow rate of each entrance road section of the intersection $$\bar{q} = \sum_{n=1}^{N} q_n / N,$$

where n is the number of the lane, and N is the total quantity of lanes of the entrance road section, $q_n$ is the lane traffic flow rate of the lane n;

the average traffic flow density of each entrance road section of the intersection $$\bar{k} = \sum_{n=1}^{N} k_n / N,$$

where n is the number of the lane, and N is the total quantity of lanes of the entrance road section, $k_n$ is the lane traffic flow density of the n-th lane.

Step S3, calculating the average traffic flow density of the intersection based on the average traffic flow density of each entrance road section, and calculating the average traffic flow density of the main road based on the average traffic flow density of the intersection.

The step S3 specifically includes:

(S31) the average traffic flow density of the intersection $$K = \sum_{m=1}^{M} \bar{k}_m / M,$$

where m is the number of the entrance road section of the intersection, M is the total quantity of entrance road section of the intersection, $\bar{k}_m$ is the average traffic flow density of the m-th entrance road section;

(S32) the average traffic flow density of the main road $$\bar{K} = \sum_{i=1}^{I} K_i / I,$$

where i is the number of intersection on the main road, the total quantity of intersections on the main road, $K_i$ is the average traffic density of the i-th intersection of the main road.

Step S4, calculating an intersection signal period of the intersection based on the average traffic flow density at the intersection.

The step S4 specifically includes:
intersection signal period of the intersection $$C = \begin{cases} 40 & K \leq 6 \\ 60 & 6 < K \leq 12 \\ 90 & 12 < K \leq 24 \\ 120 & 24 < K \leq 48 \\ 150 & 48 < K \leq 90 \\ 180 & K > 90 \end{cases},$$

where K is the average traffic flow density of the intersection.

In the specific embodiment, the intersection signal period is the time required for the lights of the signal to be displayed in turn, expressed in C, in seconds.

Step S5, constructing an intersection signal machine optimization control algorithm model based on the average lane traffic flow rate of each entrance section of the intersection and the average traffic flow density of the intersection, and obtaining the signal control green signal ratio X of each entrance road section of the intersection by the aggregation calculation.

The step S5 specifically includes:
(S51) establishing a Cartesian coordinate system at the center of the intersection, calculating the average traffic flow rate $\bar{q}_{13}$ of the X-axis direction section, and calculating the average traffic flow rate $\bar{q}_{24}$ of the Y-axis direction section;

$$\bar{q}_{13} = (\bar{q}_1 + \bar{q}_3)/2,$$

where $\bar{q}_1$ is the average traffic flow rate from the negative X-axis direction to the positive X-axis direction, $\bar{q}_3$ is the average traffic flow rate from the positive X direction to the negative X-axis direction;

$$\bar{q}_{24} = (\bar{q}_2 + \bar{q}_4)/2$$

where $\bar{q}_2$ is the average traffic flow rate from the negative direction of the Y-axis to the positive direction of the Y-axis, and $\bar{q}_4$ the average traffic flow rate from the positive direction of the Y-axis to the negative direction of the Y-axis.

(S52) establishing an optimization signal control objective function $\omega K(t) + \dot{K}(t) = 0$ of the intersection based on feedback control;
establishing a dynamic traffic flow density variation model of intersections $$\dot{K}(t) = \lim_{\Delta t \to 0} \frac{r_{13}\bar{q}_{13}\Delta t/L + (1-r_{13})\bar{q}_{24}\Delta t/L}{\Delta t} = \frac{r_{13}(\bar{q}_{13} - \bar{q}_{24}) + \bar{q}_{24}}{L};$$

combining the optimization signal control objective function and the dynamic traffic flow density variation model to calculate the green signal ratio $$r_{13} = \frac{\omega KL + \bar{q}_{24}}{\bar{q}_{24} - \bar{q}_{13}}$$

in the X-axis direction, then the signal control green signal ratio $$X_i = \frac{\omega KL + \bar{q}_{24}}{\bar{q}_{24} - \bar{q}_{13}}$$

of the i-th entrance road section of the intersection, where w>0, K(t) is the average traffic flow density of the intersection at time t, $\dot{K}(t)$ is the derivative of the average traffic flow density of the intersection at time t, where L is the length of the road section, $r_{13}$ is the objective signal control green signal ratio in the X-axis direction, $\Delta t$ is an infinitely short time.

In the specific embodiment, the goal of the signal control algorithm based on feedback control is to realize that through the adjustment of the signal the average traffic flow density of the intersection is getting smaller and smaller, and the number of queues is reduced as much as possible. Therefore, the objective function is defined, to achieve the desired results by the dynamic change of the control function.

Step S6, constructing a main road signal machine optimization control algorithm model based on the average lane traffic flow rate of each entrance road section of the main road and the average traffic flow density of the main road, and obtaining the total signal control green signal ratio Y of the road network by the aggregation calculation.

The step S6 specifically includes:
(S61) establishing a Cartesian coordinate system at the center of the main road intersection, calculating the average traffic flow rate $\bar{Q}_{13}$ of the entire road section in the X-axis direction, and calculating the average traffic flow rate $\bar{Q}_{13}$ of the Y-axis direction road section;

specifically, $\bar{Q}_{13} = (\bar{Q}_1 + \bar{Q}_3)/2$, where $\bar{Q}_1$ is the average traffic flow rate from the negative X-axis direction to the positive X-axis direction, $\bar{Q}_3$ is the average traffic flow rate from the positive X direction to the negative X-axis direction;

$\bar{Q}_{24} = (\bar{Q}_2 + \overline{QQ})/2$, where $\bar{Q}_2$ is the average traffic flow rate from the negative direction of the Y-axis to the positive direction of the Y-axis, $\bar{Q}_4$ is the average traffic flow rate from the positive direction of the Y-axis to the negative direction of the Y-axis.

(S62) establishing an optimization signal control objective function $\omega K(t) + \dot{K}(t) = 0$ of the main road based on feedback control;
establishing a dynamic traffic flow density variation model of main road $$\dot{K}(t) = \lim_{\Delta t \to 0} \frac{r_{13}\bar{Q}_{13}\Delta t/L + (1-r_{13})\bar{Q}_{24}\Delta t/L}{\Delta t} = \frac{r_{13}(\bar{Q}_{13} - \bar{Q}_{24}) + \bar{Q}_{24}}{L};$$

combining the optimization signal control objective function and the dynamic traffic flow density variation model to calculate the green signal ratio $$r_{13} = \frac{\omega KL + \bar{Q}_{24}}{\bar{Q}_{24} - \bar{Q}_{13}}$$

in the X-axis direction, then the signal control green signal ratio $$Y = \frac{\omega \overline{K} L + \overline{Q}_{24}}{\overline{Q}_{24} - \overline{Q}_{13}}$$

of the road network, where w>0, K(t) is the average traffic flow density of the main road at time t, $\dot{K}(t)$ is the derivative of the average traffic flow density of the main road at time t, where L is the length of the main road, Δt is an infinitely short time.

In the specific embodiment, the goal of the signal control algorithm based on feedback control, is to realize that the average traffic flow density of the main road intersection is getting smaller and smaller, and the number of queues is reduced as much as possible, through the adjustment of the signal. Therefore, the objective function is defined, to achieve the desired results by the dynamic change of the control function.

Step S7, comprehensive calculating the final optimized signal control green signal ratio Z, based on the signal control green signal ratio X of each entrance road section of the intersection and the total signal control green signal ratio Y of the road network.

The step S7 specifically includes: the final optimized signal control green signal ratio of the i-th intersection of the main road $$Z_i = \frac{X_i + Y}{2}.$$

Step S8, calculating a green time, a yellow time, and a red time of the main road signal timing based on the final optimized signal control green signal ratio Z and the intersection signal period.

The step S8 specifically includes:

the green time $G_{13}(i)=C_i \times Z_i$ of the X-axis direction of the i-th intersection of the main road, the red time of the east-west direction $R_{13}(i)=C_i-G_{13}(i)-Y$, where $C_i$ is the average traffic flow density of the i-th intersection of the main road, $10 \leq G_{13}(i) \leq C-10$, Y is the yellow time.

Step S9, forming a signal control scheme instruction for the next signal period of each intersection of the main road according to the green time, the yellow time and the red time of the main road signal timing.

Step S10, controlling the traffic light of each intersection of the main road carrying out traffic dynamic induction according to the signal control scheme instruction of the next signal cycle of each intersection of the main road, after the end of the cycle control scheme of the signal light.

Figure 4:
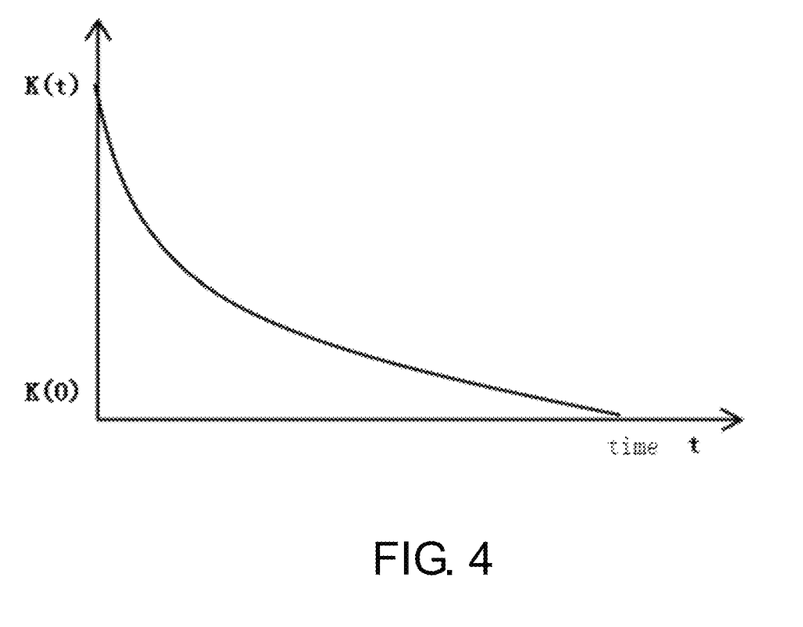
FIG. 4 is a feedback control density variation curve in the present application.

In the specific embodiment, the interpretation of the target control function is that after adjusting by the feedback control, the average traffic flow density of the intersection becomes more and more 0 with time, that is, the number of vehicles at the intersection is less and less, so the traffic efficiency can be maximized and the traffic congestion can be reduced, as shown in FIG. 4.

This application is based on the feedback control theory, extracting the signal control optimization algorithm of intersection, through the real-time detection and comprehensive analysis of the average traffic density of each intersection of the main road, can greatly improve the traffic operation efficiency of the intersection; based on the detected traffic flow rate and the traffic flow density parameter, the real-time traffic status of each intersection are accurately detected on the main road, formulating an optimal signal control scheme for the main road, providing real-time decision-making and emergency response information for trunk road traffic management and control, and improving road traffic efficiency and service level.

The above is only the preferred embodiment of the present application, but the scope of protection of the present application is not limited thereto, and any equivalents or modifications of the technical solutions of the present application and the application concept thereof should be included in the scope of the present application within the scope of the technical scope of the present application.

What is claimed is:

1. A video-based main road cooperative signal machine control method, comprising:
    (S1) collecting lane traffic flow rate and lane traffic flow density of each entrance road section within a preset time interval, by means of video vehicle detectors arranged on each section of the intersection;
    (S2) calculating average traffic flow rate and average traffic flow density of each entrance road section of the intersection based on lane traffic flow rate and lane traffic flow density of each entrance road section within the preset time interval;
    (S3) calculating the average traffic flow density of the intersection based on the average traffic flow density of each entrance road section, and calculating the average traffic flow density of the main road based on the average traffic flow density of the intersection;
    (S4) calculating an intersection signal period of the intersection based on the average traffic flow density at the intersection;
    (S5) constructing an intersection signal machine optimization control algorithm model based on the average lane traffic flow rate of each entrance section of the intersection and the average traffic flow density of the intersection, and obtaining the signal control green signal ratio X of each entrance road section of the intersection by the aggregation calculation;
    (S6) constructing a main road signal machine optimization control algorithm model based on the average lane traffic flow rate of each entrance road section of the main road and the average traffic flow density of the main road, and obtaining the total signal control green signal ratio Y of the road network by the aggregation calculation;
    (S7) comprehensive calculating the final optimized signal control green signal ratio Z, based on the signal control green signal ratio X of each entrance road section of the intersection and the total signal control green signal ratio Y of the road network;
    (S8) calculating a green time, a yellow time, and a red time of the main road signal timing based on the final optimized signal control green signal ratio Z and the intersection signal period;
    (S9) form a signal control scheme instruction for the next signal period of each intersection of the main road according to the green time, the yellow time and the red time of the main road signal timing;
    (S10) controlling the traffic light of each intersection of the main road carrying out traffic dynamic induction according to the signal control scheme instruction of the next signal cycle of each intersection of the main road, after the end of the cycle control scheme of the signal light.

2. The video-based main road cooperative signal machine control method according to claim 1, wherein the step S2 specifically comprises:

the average traffic flow rate of each entrance road section of the intersection $$\bar{q} = \sum_{n=1}^{N} q_n / N,$$

where n is the number of the lane, and N is the total quantity of lanes of the entrance road section, $q_n$ is the lane traffic flow rate of the lane n;

the average traffic flow density of each entrance road section of the intersection $$\bar{k} = \sum_{n=1}^{N} k_n / N,$$

where n is the number of the lane, and N is the total quantity of lanes of the entrance road section, $k_n$ is the lane traffic flow density of the n-th lane.

3. The video-based main road cooperative signal machine control method according to claim 2, wherein the step S3 specifically comprises:

(S31) the average traffic flow density of the intersection $$K = \sum_{m=1}^{M} \bar{k}_m / M,$$

where m is the number of the entrance road section of the intersection, M is the total quantity of entrance road section of the intersection, $\bar{k}_m$ is the average traffic flow density of the m-th entrance road section;

(S32) the average traffic flow density of the main road $$K = \sum_{i=1}^{I} K_i / I,$$

where i is the number of intersection on the main road, the total quantity of intersections on the main road, $K_i$ is the average traffic density of the i-th intersection of the main road.

4. The video-based main road cooperative signal machine control method according to claim 3, wherein the step S4 specifically comprises:

intersection signal period of the intersection $$C = \begin{cases} 40 & K \le 6 \\ 60 & 6 < K \le 12 \\ 90 & 12 < K \le 24 \\ 120 & 24 < K \le 48 \\ 150 & 48 < K \le 90 \\ 180 & K > 90, \end{cases}$$

where K is the average traffic flow density of the intersection.

5. The video-based main road cooperative signal machine control method according to claim 4, wherein the step S3 specifically comprises:

(S51) establishing a Cartesian coordinate system at the center of the intersection, calculating the average traffic flow rate $\bar{q}_{13}$ of the X-axis direction section, and calculating the average traffic flow rate $\bar{q}_{24}$ of the Y-axis direction section;

(S52) establishing an optimization signal control objective function $\omega K(t) + \dot{K}(t) = 0$ of the intersection based on feedback control;

establishing a dynamic traffic flow density variation model of intersections $$\dot{K}(t) = \lim_{\Delta t \to 0} \frac{r_{13}\bar{q}_{13}\Delta t/L + (1-r_{13})\bar{q}_{24}\Delta t/L}{\Delta t} = \frac{r_{13}(\bar{q}_{13}-\bar{q}_{24}) + \bar{q}_{24}}{L};$$

combining the optimization signal control objective function and the dynamic traffic flow density variation model to calculate the green signal ratio $$r_{13} = \frac{\omega KL + \bar{q}_{24}}{\bar{q}_{24} - \bar{q}_{13}}$$

in the X-axis direction, then the signal control green signal ratio $$X_i = \frac{\omega KL + \bar{q}_{24}}{\bar{q}_{24} - \bar{q}_{13}}$$

of the i-th entrance road section of the intersection, where w>0, K(t) is the average traffic flow density of the intersection at time t, $\dot{K}(t)$ is the derivative of the average traffic flow density of the intersection at time t, where L is the length of the road section, $r_{13}$ is the objective signal control green signal ratio in the X-axis direction, Δt is an infinitely short time.

6. The video-based main road cooperative signal machine control method according to claim 5, wherein the step S51 specifically comprises:

$$\bar{q}_{13} = (\bar{q}_1 + \bar{q}_3)/2,$$

where $\bar{q}_1$ is the average traffic flow rate from the negative X-axis direction to the positive X-axis direction, $\bar{q}_3$ is the average traffic flow rate from the positive X direction to the negative X-axis direction;

$$\bar{q}_{24} = (\bar{q}_2 + \bar{q}_4)/2,$$

where $\bar{q}_2$ is the average traffic flow rate from the negative direction of the Y-axis to the positive direction of the Y-axis, and $\bar{q}_4$ the average traffic flow rate from the positive direction of the Y-axis to the negative direction of the Y-axis.

7. The video-based main road cooperative signal machine control method according to claim 5, wherein the step S6 specifically comprises:

(S61) establishing a Cartesian coordinate system at the center of the main road intersection, calculating the average traffic flow rate $\bar{Q}_{13}$ of the entire road section in the X-axis direction, and calculating the average traffic flow rate $\bar{Q}_{13}$ of the Y-axis direction road section;

(S62) establishing an optimization signal control objective function $\omega K(t)+ \dot{K}(t) =0$ of the main road based on feedback control;

establishing a dynamic traffic flow density variation model of main road $$\dot{K}(t) = \lim_{\Delta t \to 0} \frac{r_{13}\overline{Q}_{13}\Delta t/L + (1-r_{13})\overline{Q}_{24}\Delta t/L}{\Delta t} = \frac{r_{13}(\overline{Q}_{13} - \overline{Q}_{24}) + \overline{Q}_{24}}{L};$$

combining the optimization signal control objective function and the dynamic traffic flow density variation model to calculate the green signal ratio $$r_{13} = \frac{\omega KL + \overline{Q}_{24}}{\overline{Q}_{24} - \overline{Q}_{13}}$$

in the X-axis direction, then the signal control green signal ratio $$Y = \frac{\omega \overline{K} L + \overline{Q}_{24}}{\overline{Q}_{24} - \overline{Q}_{13}}$$

of the road network, where w>0, K(t) is the average traffic flow density of the main road at time t, $\dot{K}(t)$ is the derivative of the average traffic flow density of the main road at time t, where L is the length of the main road, $\Delta t$ is an infinitely short time.

8. The video-based main road cooperative signal machine control method according to claim 7, wherein the step S61 specifically comprises:

$\overline{Q}_{13}=(\overline{Q}_1+\overline{Q}_3)/2$, where $\overline{Q}_1$ is the average traffic flow rate from the negative X-axis direction to the positive X-axis direction, $\overline{Q}_3$ is the average traffic flow rate from the positive X direction to the negative X-axis direction;

$\overline{Q}_{24}=(\overline{Q}_2+\overline{Q}_4)/2$, where $\overline{Q}_2$ is the average traffic flow rate from the negative direction of the Y-axis to the positive direction of the Y-axis, $\overline{Q}_4$ is the average traffic flow rate from the positive direction of the Y-axis to the negative direction of the Y-axis.

9. The video-based main road cooperative signal machine control method according to claim 8, wherein the step S7 specifically comprises:

the final optimized signal control green signal ratio of the i-th intersection of the main road $$Z_i = \frac{X_i + Y}{2}.$$

10. The video-based main road cooperative signal machine control method according to claim 9, wherein the step S8 specifically comprises:

the green time $G_{13}(i)=C_i \times Z_i$ of the X-axis direction of the i-th intersection of the main road, the red time of the east-west direction $R_{13}(i)=C_i-G_{13}(i)-Y$, where $C_i$ is the average traffic flow density of the i-th intersection of the main road, $10 \leq G_{13}(i) \leq C-10$, Y is the yellow time.

* * * * *